July 26, 1949.　　　K. A. SWANSTROM ET AL　　　2,477,429
HOLDER FOR FASTENER ELEMENTS
Filed May 15, 1943　　　　　　　　　　　2 Sheets-Sheet 1
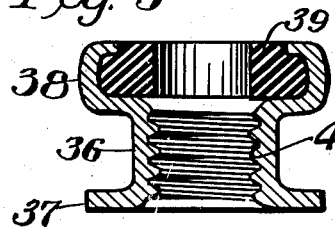
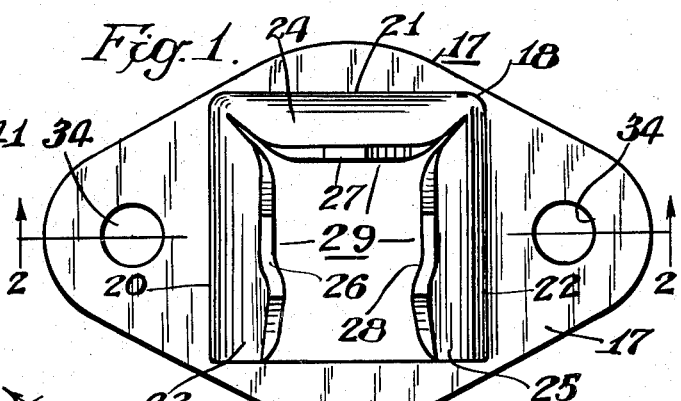
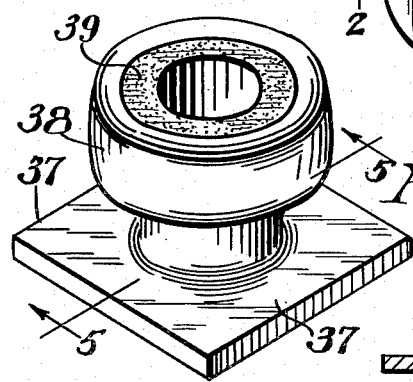
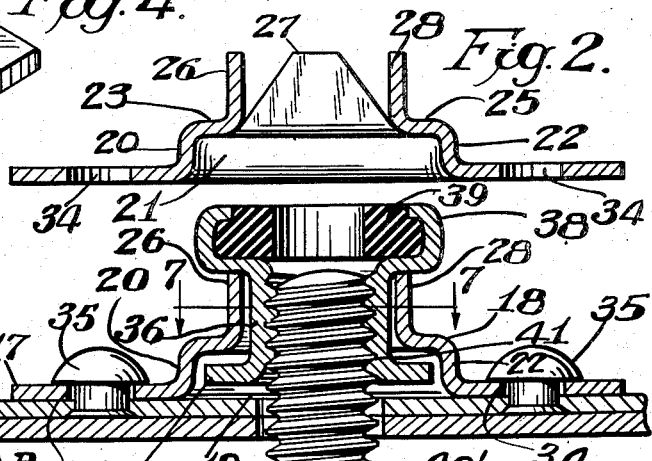
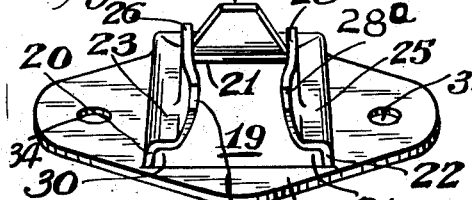
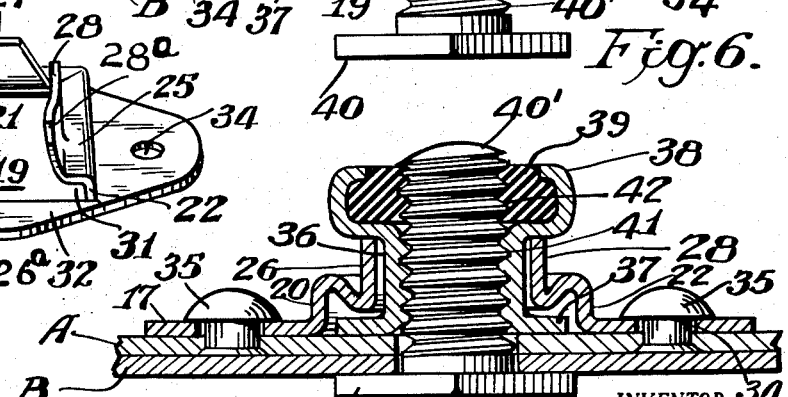
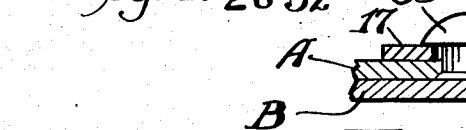
INVENTOR.
Klas A. Swanstrom
BY Birger G. Sandemar
Attorney July 26, 1949.  K. A. SWANSTROM ET AL  2,477,429
HOLDER FOR FASTENER ELEMENTS
Filed May 15, 1943  2 Sheets-Sheet 2
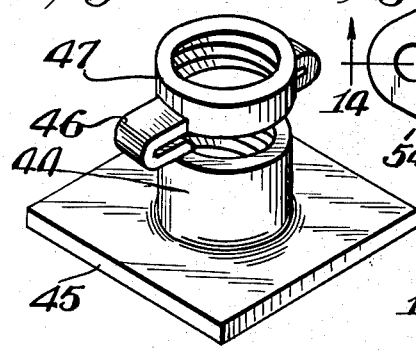
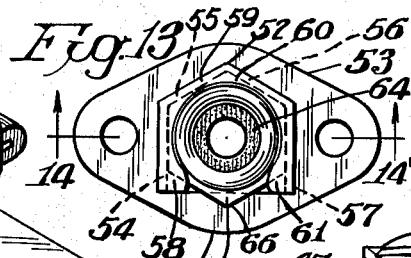
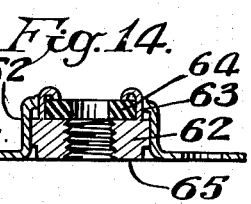
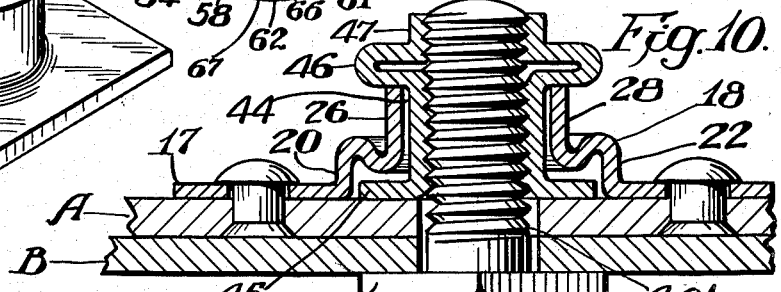
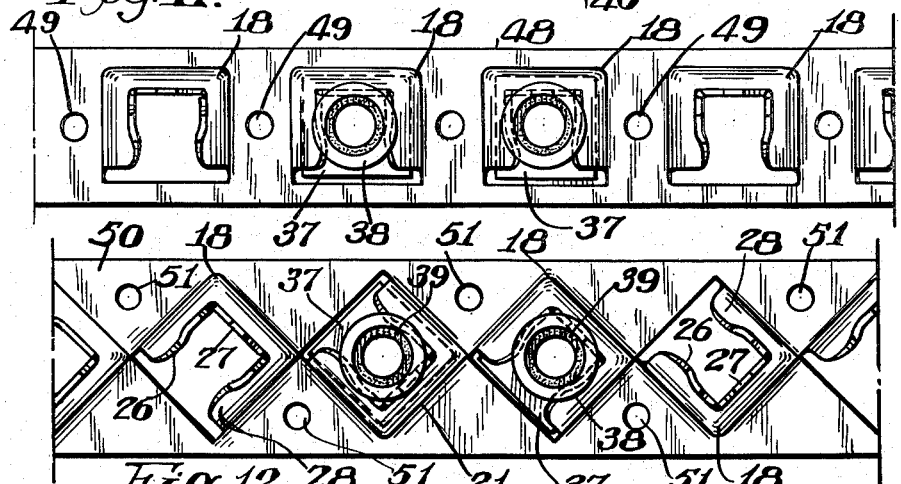
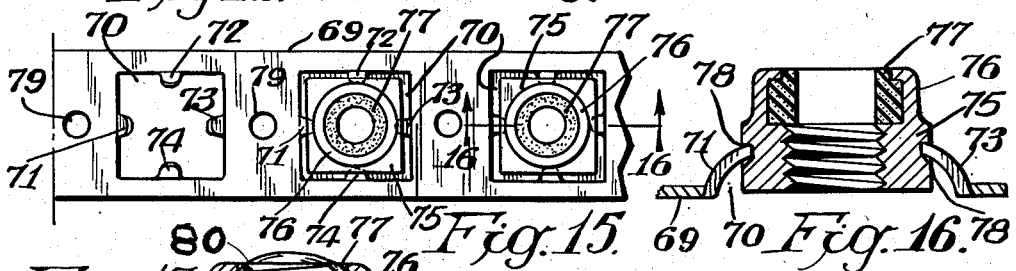
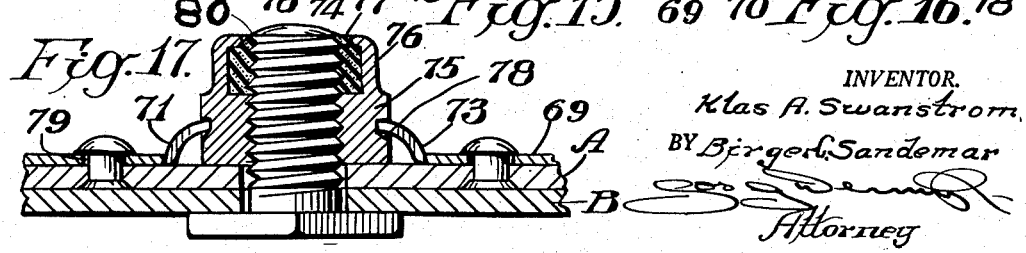
INVENTOR.
Klas A. Swanstrom,
BY Birger L. Sandemar
Attorney Patented July 26, 1949

2,477,429

UNITED STATES PATENT OFFICE 2,477,429

HOLDER FOR FASTENER ELEMENTS

Klas Arent Swanstrom, Buckingham Township, Bucks County, Pa., and Birger C. Sandemar, Union, N. J.; said Sandemar assignor to K. A. Swanstrom Application May 15, 1943, Serial No. 487,070

2 Claims. (Cl. 85—32)

Our invention is a holder for positioning one of a pair of complementary fastener elements so that the other or free element of the pair may be readily coupled thereto to effect the attachment of a plurality of members to one of which the holder is attached and through both of which the second element passes.

A leading object of our invention is the provision of a holder by which a nut or other fastener element may be held in predetermined position on a supporting member against the surface of which the bottom of the nut may be directly and firmly drawn by the action of a complementary screw having its head engaging the surface of a supported member so that a firm, tight joint is made, thereby minimizing corrosion, vibration and deterioration.

A further object of our invention is the provision of a holder permitting ready insertion and removal of a nut or fastener element with little risk of inadvertent displacement and loss thereof.

A further object of our invention is the provision of a holder permitting ready insertion and removal of a nut or fastener element after the holder has been permanently mounted on a support or other member to be fastened.

A further object of our invention is the provision of a holder having members which may be placed under stress by the coaction of coupled fastener elements and when so stressed exert a radial thrust tending to prevent the uncoupling of the fastener elements by vibration.

A further object of our invention is the provision of a yielding holder permitting direct contact between a fastener element and a support but which will automatically displace the fastener element from the support when a complementary fastener element is loosened.

A further object of our invention is the provision of a holder allowing a nut sufficient radial play to adjust itself to a screw or to permit removal of the nut from the holder and also allowing the nut sufficient axial movement to abut against a support.

A further object of our invention is the provision of a holder permitting the insertion and removal of a plurality of nuts without interfering with one another, and preferably of such longitudinal flexibility as to conform to curved, angular or irregular surfaces and be bendable around corners.

A further object of our invention is the provision of a holder permitting assembly of a plurality of nuts in close center to center relation without interfering with the attachment of the holder to a support.

A further object of our invention is the provision of a holder for a fastener having an enlarged head and foot connected by an internally threaded shank of restricted cross section and forming a channel into which project keepers forming part of the holder to support the head and loosely confine the foot. Such fasteners are preferably made by drawing sheet metal but may be made by machining solid stock.

In its preferred form, our invention comprises a base provided with rivet holes or welding projections and with one or more nut cages formed by slitting and bending the metal of the base to form reversely bent members around edges of an aperture formed by the displacement of such members. The reversely bent members on opposite sides of the aperture form parallel guideways and keepers having an open constricted mouth at one end and stops formed by a reversely bent member at the other end. When the enlarged foot of a nut is slipped laterally into a pair of guideways the shank spreads the free ends of the keepers and snaps into the space between them and after the foot has completely crossed the sill between the guideways, the foot drops slightly into the base aperture, viz., below the level of the top of the base, to permit the head of the nut to rest on the tops of the converging keepers projecting outwardly from the base of the holder. This prevents accidental displacement of the nut from the holder, but the nut may be removed therefrom by slightly lifting the head from the keepers and sliding the base laterally across the sill.

Our invention is, however, susceptible of a wide variety of embodiments and the characteristic features and advantages of our invention will further appear from the following description and the accompanying drawings of several illustrative embodiments thereof.

In the drawings, Fig. 1 is a detached top plan view of a holder for positioning a detachable fastener element relatively to a support; Fig. 2 is a longitudinal sectional view of the holder shown in Fig. 1 taken on the line 2—2 thereof; Fig. 3 is a perspective view, on a smaller scale, of the holder shown in Figs. 1 and 2; Fig. 4 is a perspective view of one form of fastener element or lock nut suitable for insertion in the holder of Figs. 1 to 3; Fig. 5 is a vertical sectional view taken on the line 5—5 of Fig. 4; Fig. 6 is a longitudinal sectional view showing the nut of Figs. 4 and 5 inserted in the holder of Figs. 1 to 3 in cooperative relation with fastened members and a fastener element or screw passing therethrough into cooperative relation with the nut positioned by the holder; Fig. 7 is a transverse sectional view taken on the line 7—7 of Fig. 6; Fig. 8 is a longitudinal sectional view of the parts shown in Fig. 6 after the screw and nut have been drawn up against the respective fastened members; Fig. 9 is a perspective view of a further form of fastener element or lock nut adapted for insertion in the holder of Figs. 1 to 3; Fig. 10 is a longitudinal sectional view showing the fastener element of Fig. 9 inserted in the holder shown in Figs. 1 to 3 and in cooperative relation with a screw and with members secured together by the screw and hold element; Fig. 11 is a top plan view of a flexible strip provided with holders for a series of nuts such as shown in Figs. 4 and 9; Fig. 12 is a top plan view of a flexible strip provided with holders for a series of nuts such as shown in Figs. 4 and 9 in close center to center relation; Fig. 13 is a top plan view of a modified form of nut holder and nut embodying our invention; Fig. 14 is a longitudinal sectional view taken on the line 14—14 of Fig. 13; Fig. 15 is a top plan view of a modified form of a flexible strip provided with a series of nut holders with nuts in some of them; Fig. 16 is a longitudinal sectional view taken on the line 16—16 of Fig. 15; and Fig. 17 is an enlarged fragmentary longitudinal sectional view showing the assembly of a nut and holder of Figs. 15 and 16 with fastened members; the nut being drawn against a fastened member by a screw.

In the embodiment of our invention illustrated in Figs. 1 to 8 of the drawings, a base 17 is cut and bent to form an embossed cage 18 projecting from one surface of the base and having an open and unobstructed bottom 19 (Figs. 3 and 6).

The cage preferably comprises the integral flanges 20, 21, 22 turned outwardly from the base, the flanges 23, 24 and 25 extending substantially parallel with the base, and the outwardly turned but slightly converging tapering lips or keepers 26, 27 and 28 having an opening 29 between their upper edges.

The pairs of flanges 20, 23 and 22, 25 form parallel slideways 30 and 31 (Fig. 3) open at one end but closed at the opposite end by the transverse flange 21.

The flanges 20, 21 and 22 may form a continuous perimeter around three sides of the opening 19 and the fourth side of such opening is closed by a strip 32 integral with and in the plane of the base 17. The base 17 may be provided with end extensions containing rivet apertures or welding projections 34. The base 17 may be secured to a support, such as an airplane frame member A, by countersunk rivets 35.

The flanges and keepers numbered 20 to 28, inclusive, may be formed by slotting a blank along a line parallel to but offset from a center line passing through the centers of the apertures 34 to form the inner edge of the strip 32; slotting the blank along a line at right angles to the center line so as to separate the members 26 and 28 from one another; slotting the blank along diagonal lines to separate the part 27 from the parts 26 and 28; slotting the blank along other diagonal lines so as to clip the corners of the parts 26 and 28 to form bevels such as indicated at 26ª and 28ª of Figs. 1 and 3. The blank is then embossed to form the flanges 20 to 25, inclusive, and the keepers 26 to 28, inclusive, are bent outwardly from the embossed flanges 23, 24, 25. The slitting and forming operations may be performed in a single dieing operation or in separate dieing operations.

The cage thus formed is designed to receive and detachably retain a fastener element or nut comprising an internally threaded shank 36, a rectangular base or foot 37 and an annular head 38 supporting an apertured ring 39; the shank 36 being of smaller transverse cross section than the base 37 or head 38, but larger than the distance between the ends 26ª and 28ª of the keepers 26 and 28.

The base 37 is made of such size and shape as to fit between the flanges 20 and 22 and between the flange 21 and strip 32, and when the base 37 is so positioned the shank or neck 36 lies between the keepers 26, 27 and 28 and the underside of the head 38 rides on the tops of such keepers. Preferably the length of the shank 36 is sufficient to permit the lower surface of the base 37 to drop slightly below the top surface of the strip 32 so as to prevent accidental displacement of a seated element, which, however, can be readily removed from the cage by slightly lifting the head 38 from the keepers 26, 27 and 28 and moving the base 37 laterally over the top of the strip 32. The holder base 17 may be attached to the support A and the fastener elements subsequently inserted in the cages 18. Any defective or damaged fastener elements may be readily removed and replaced, but the danger of inadvertent dislocation and loss of a fastener element is obviated or minimized.

The fastener element preferably has sufficient play within the cage 18 to facilitate alignment of such caged fastener element with a complementary fastener element 40 movable through the sheet B for attachment of the latter to the support A.

In the example shown, the element 40 consists of a screw having a head and an externally threaded shank 40' which engages an internal helical thread 41 in the shank 36 and presses a thread 42 into the wall of the apertured fibre ring or washer 39 seated in the head 38.

Continued rotation of the screw 40 after its head engages the surface of the plate B draws the caged fastener 36 axially until its base 37 is drawn flush against the support A. The downward axial movement of the fastener head 38 distorts the cage flanges and keepers from the positions shown in Fig. 6 to the positions shown in Fig. 8. The stress thus set up imparts an axial thrust to the head 38 tending to press the upper or load carrying surfaces of the nut threads 41 against the lower surfaces of the screw threads independently of the engagement between the base 37 and support A, thereby complementing the locking action of the elastic washer 39 on the shank 40' and preventing relative axial play between the nut and screw or the loosening of the nut or screw as a result of vibration.

It will be understood that the elastic washer 39 is held against rotation by the head 38 and that the thread 42 is not precut but is impressed in the washer by the advance of the screw 40. The initial advance of the screw shank 40' against the apertured but unthreaded washer 39 sets up an axial pressure forcing the load carrying surfaces of the nut threads 41 into intimate contact with the complementary surfaces of the threads of the shank 40' where they are maintained permanently by the action of the washer 39 after the continued advance of the shank 40' has impressed screw threads into the washer. Axial play between the nut and bolt is thus eliminated and a frictional braking effect is also exerted by the washer 39 against rotation of the screw 40.

The base 17 and cage 18 are preferably composed of sheet metal, plastic or fibre of such resiliency that when the bolt 40 is unscrewed the cage 18 will be wholly or partly restored to its initial position shown in Fig. 6 to facilitate the removal of the nut and the insertion of another one through the mouths of the guide-ways 30 and 31. If desired, the flanges and keepers 20 to 28, inclusive, may be made sufficiently yielding to permit the initial assembly of a nut in the cage by pushing the head 38 from the open bottom 19 through the opening 29 between the keepers 26, 27 and 28, but the flanges 20 to 22, inclusive, are preferably united at their corners so as to provide sufficient rigidity to effectively prevent any rotation of the foot 37 by the torque applied in driving home the screw. During the final tightening of the screw, the foot 37 is down in the base aperture 29 whose walls effectively prevent any rotation of the foot.

In lieu of the fastener element shown in Figs. 4 and 5, there may be inserted in the cage 18 a fastener element or nut comprising a threaded stem 44, an enlarged rectangular base 45, and an enlarged expansible head 46 supporting a ring 47 containing threads which are out of phase with the threads of the stem 44, as shown in Figs. 9 and 10. The expansible head 46 is of sufficient resiliency to maintain an axial thrust tending to keep the load-carrying surfaces of the threads of the nut 44 in contact with the complementary surfaces of the thread of the shank 40' when it is threaded into the nut 44 and ring 47. The distortion of the cage 18 resulting from the drawing up of the bolt 40 tends to exert an axial pressure on the head 46 complementary to the action of the ring 47 in locking the screw 40 and nut 44 together.

The cage of our invention is particularly advantageous where it is desired to position a series of nuts on a support in predetermined relationship to one another. To facilitate such positioning, a sequence of parallel cages 18 are struck up from a flexible strip 48 having rivet holes or welding projections 49 between the consecutive cages as shown in Fig. 11. Such flexible strips 48 are free from continuous longitudinal ribs or flanges and may be bent to conform with curved or angular supporting surfaces and riveted or welded thereto to receive fastener elements having large heads and bases and constricted shanks, such as above described.

When it is desired to shorten the center to center distance between fasteners, rectangular cages 18 may be positioned diagonally along a flexible strip 50, as illustrated in Fig. 12. These cages 18 are stamped from the flexible strip 50 with corners of the cages abutting one another and with the mouth of one cage substantially aligned with a side flange of an adjacent cage so that when a nut base 37 or 45 is moved into or out of one cage it moves along the back flange 21 of an adjacent cage. The strip 50 may be readily bent longitudinally to conform to a curved or irregular surface, to which it may be secured by means of staggered rivet holes or welding projections 51.

Figs. 13 and 14 illustrate a modification of our invention adapting it for use with solid hexagonal stop nuts made from bar stock or the like. In this modification of our invention, a five-sided cage 52 is bent up from a sheet metal base 53 to form flanges 54, 55, 56 and 57 bent at right angles to the surface of the base and inturned lips or keepers 58, 59, 60 and 61 substantially parallel with the surface of the base. A solid hexagonal nut 62 is provided with a head 63 for holding an apertured elastic stop washer 64; and with a base 65 formed by a peripheral undercut. The head 64 is of smaller diameter than the body 62 of the nut so that the nut can be pushed into and out of the cage 52 through the mouth formed by the extremities of the keepers 58 and 61. The circumferential undercut or channel in the bottom of the nut has an axial depth at least equal to the thickness of the base 53 and a radial width at least equal to the projection of the corner 66 of the nut over the strip 67. When the nut 62 is slipped into the cage 52 it is held therein by the frictional engagement of the keepers 58 and 61 with the head 64 and by the engagement of the forward projecting corner 66 of the nut, above the bottom undercut, with the strip 67. The nut may, however, be moved axially by the engagement of a bolt therewith so as to bring the bottom of the nut flush against the surface of a support to which the base 53 is secured.

A further modification of our invention is shown in Figs. 15, 16 and 17 in which a flexible strip 69 has apertures 70 punched therefrom and integral yielding keepers 71, 72, 73 and 74 curved upwardly from the side walls surrounding the apertures 70. Square solid nuts 75 are provided with constricted heads 76 supporting stop washers 77 and are also provided with peripheral body recesses 78 into which the resilient keepers 71, 72, 73 and 74 snap when a nut is pushed through a hole 70 from the side of the strip opposite the keepers. Between the cages formed by the keepers 71, 72, 73, 74, the strip is provided with rivet holes or welding projections 79, by means of which the strip, with the nuts assembled in the cages, is attached to a support A. A plate B may be secured in place on the support by passing a screw 80 through the plates B and A and into the nut 75 which is drawn down flush against the surface of the support A by the yielding action of the keepers 71, 72, 73 and 74.

Having described our invention, we claim:

1. A fastener comprising a nut having a head and a base and a shank of smaller cross-section than said head and base, said head having locking means and said shank containing an internal thread, of a keeper comprising a base containing an opening larger than the base of said nut and having resilient fingers extending upwardly from opposite sides of said opening and in close juxtaposition to the base of said nut, each of said resilient fingers including a section extending transversely to said base, a section bent transversely to said first named section and a section bent transversely to said second section and extending into juxtaposition to said shank and engaging the head of said nut, said fingers normally positioning said nut with its base adjacent to the base of said keeper.

2. A fastener as set forth in claim 1 and having a third finger bent up from an edge of the opening in the base of said keeper and intersecting one end of the slideway formed by the other two fingers, the other end of said slideway being open and permitting the lateral displacement of said nut from said keeper.

K. ARENT SWANSTROM.
BIRGER C. SANDEMAR.

(References on following page)

REFERENCES CITED

The following references are of record in the file of this patent:

UNITED STATES PATENTS

| Number | Name | Date |
|---|---|---|
| 1,272,919 | Crawford | July 16, 1918 |
| 1,405,994 | Fisher | Feb. 7, 1922 |
| 1,570,148 | Herr | Jan. 19, 1926 |
| 1,579,875 | Lundberg | Apr. 6, 1926 |
| 1,760,834 | Carr | May 27, 1930 |
| 1,831,011 | Richardson | Oct. 17, 1933 |
| 1,960,381 | Knapp | May 29, 1934 |
| 2,079,917 | Mitchel | May 11, 1937 |
| 2,079,918 | Mitchel | May 11, 1937 |
| 2,144,350 | Swanstrom | Jan. 17, 1939 |
| 2,144,553 | Simmonds | Jan. 17, 1939 |
| 2,244,823 | Burke | June 10, 1941 |
| 2,249,923 | Whitcombe | July 22, 1941 |
| 2,255,101 | Burke | Sept. 9, 1941 |
| 2,259,720 | Amesbury | Oct. 21, 1941 |
| 2,265,661 | Luce | Dec. 9, 1941 |
| 2,283,122 | Murphy | May 12, 1942 |
| 2,299,158 | Luce | Oct. 20, 1942 |
| 2,304,107 | Leisure | Dec. 8, 1942 |
| 2,321,497 | Luce | June 8, 1943 |
| 2,333,386 | Murphy | Nov. 2, 1943 |
| 2,339,130 | Albin | Jan. 11, 1944 |
| 2,391,046 | Tinnerman | Dec. 18, 1945 |